United States Patent
Achenbach et al.

(10) Patent No.: US 10,787,125 B2
(45) Date of Patent: Sep. 29, 2020

(54) VEHICULAR CAMERA SYSTEM

(71) Applicant: MAGNA ELECTRONICS INC., Auburn Hills, MI (US)

(72) Inventors: Garret F. Achenbach, Rochester Hills, MI (US); Brian J. Winden, Rochester, MI (US); Christopher L. Van Dan Elzen, Rochester, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 405 days.

(21) Appl. No.: 15/457,056

(22) Filed: Mar. 13, 2017

(65) Prior Publication Data

US 2017/0182944 A1  Jun. 29, 2017

Related U.S. Application Data

(63) Continuation of application No. 14/233,507, filed as application No. PCT/US2012/048993 on Jul. 31, 2012, now Pat. No. 9,596,387.

(Continued)

(51) Int. Cl.
*H04N 5/225* (2006.01)
*H05K 7/20* (2006.01)
(Continued)

(52) U.S. Cl.
CPC ............. *B60R 1/00* (2013.01); *B60R 1/04* (2013.01); *B60R 1/12* (2013.01); *B60R 11/04* (2013.01);
(Continued)

(58) Field of Classification Search
CPC .... B60R 1/00; B60R 1/04; B60R 1/12; B60R 11/04; B60R 2001/1215;
(Continued)

(56) References Cited

U.S. PATENT DOCUMENTS 4,514,530 A   4/1985  Sellstrom et al.
4,634,884 A   1/1987  Hayashimoto
(Continued)

FOREIGN PATENT DOCUMENTS

CN  01059596 A  3/1992
CN  1743887 A   3/2006
(Continued)

OTHER PUBLICATIONS

International Search Report and Written Opinion dated Oct. 22, 2012 from corresponding PCT Application No. PCT/US2012/048993.

*Primary Examiner* — Jamie J Atala
*Assistant Examiner* — Patrick E Demosky
(74) *Attorney, Agent, or Firm* — Honigman LLP

(57) ABSTRACT

A camera system for a vehicle includes a camera module having an imager assembly, a main circuit board and a camera housing, with the imager assembly including (i) an imager disposed on an imager circuit board and (ii) a lens assembly having a lens barrel accommodating a lens. A bracket is configured to attach at the vehicle windshield and to receive the camera module. The lens barrel extends from a portion of the lens assembly that is enclosed by the camera housing through an aperture to protrude outside the camera housing. With the camera module received by the bracket and with the bracket attached at the windshield, a forward portion of the camera housing is below the lens barrel. A separate stray light shield is disposed at the forward portion of the camera housing to reduce incidence of stray light at the lens.

23 Claims, 15 Drawing Sheets

Related U.S. Application Data

(60) Provisional application No. 61/583,431, filed on Jan. 5, 2012, provisional application No. 61/514,191, filed on Aug. 2, 2011.

(51) Int. Cl.
| | |
|---|---|
| *B60R 1/00* | (2006.01) |
| *B60R 1/04* | (2006.01) |
| *B60R 1/12* | (2006.01) |
| *B60R 11/04* | (2006.01) |
| *B60R 11/00* | (2006.01) |

(52) U.S. Cl.
CPC ......... *H04N 5/2251* (2013.01); *H04N 5/2252* (2013.01); *H04N 5/2253* (2013.01); *H04N 5/2254* (2013.01); *H04N 5/2257* (2013.01); *B60K 2370/152* (2019.05); *B60K 2370/173* (2019.05); *B60K 2370/21* (2019.05); *B60K 2370/777* (2019.05); *B60R 2001/1215* (2013.01); *B60R 2001/1253* (2013.01); *B60R 2011/0026* (2013.01); *B60R 2300/102* (2013.01); *B60R 2300/105* (2013.01); *B60R 2300/303* (2013.01); *B60R 2300/607* (2013.01); *B60R 2300/804* (2013.01); *B60R 2300/806* (2013.01); *B60R 2300/8026* (2013.01); *Y10T 29/49169* (2015.01)

(58) Field of Classification Search
CPC ..... B60R 2001/1253; B60R 2011/0026; B60R 2300/102; B60R 2300/105; B60R 2300/303; B60R 2300/607; B60R 2300/8026; B60R 2300/804; B60R 2300/806; H04N 5/2251; H04N 5/2252; H04N 5/2253; H04N 5/2254; H04N 5/2257; Y10T 29/49169; B60K 2350/106; B60K 2350/1088; B60K 2350/2013; B60K 2350/927

See application file for complete search history.

(56) References Cited

U.S. PATENT DOCUMENTS

| | | |
|---|---|---|
| 4,712,879 A | 12/1987 | Lynam et al. |
| 4,786,966 A | 11/1988 | Hanson et al. |
| 5,073,012 A | 12/1991 | Lynam |
| 5,076,673 A | 12/1991 | Lynam et al. |
| 5,096,287 A | 3/1992 | Kakinami et al. |
| 5,098,287 A | 3/1992 | Duncan et al. |
| 5,115,346 A | 5/1992 | Lynam |
| 5,130,804 A | 7/1992 | Tamura |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,204,615 A | 4/1993 | Richards |
| 5,253,109 A | 10/1993 | O'Farrell et al. |
| 5,371,659 A | 12/1994 | Pastrick et al. |
| 5,406,414 A | 4/1995 | O'Farrell et al. |
| 5,497,306 A | 3/1996 | Pastrick |
| 5,525,264 A | 6/1996 | Cronin et al. |
| 5,550,677 A | 8/1996 | Schofield et al. |
| 5,559,556 A | 9/1996 | Kageback |
| 5,567,360 A | 10/1996 | Varaprasad et al. |
| 5,610,756 A | 3/1997 | Lynam et al. |
| 5,657,539 A | 8/1997 | Orikasa et al. |
| 5,668,663 A | 9/1997 | Varaprasad et al. |
| 5,669,699 A | 9/1997 | Pastrick et al. |
| 5,670,935 A | 9/1997 | Schofield et al. |
| 5,724,187 A | 3/1998 | Varaprasad et al. |
| 5,760,962 A | 6/1998 | Schofield et al. |
| 5,796,094 A | 8/1998 | Schofield et al. |
| 5,821,532 A | 10/1998 | Beaman et al. |
| 5,823,654 A | 10/1998 | Pastrick et al. |
| 5,854,708 A | 12/1998 | Komatsu et al. |
| 5,872,332 A | 2/1999 | Verma |
| 5,877,897 A | 3/1999 | Schofield et al. |
| 5,910,854 A | 6/1999 | Varaprasad et al. |
| 5,920,061 A * | 7/1999 | Feng ............... G06K 7/10722 235/462.42 |
| 5,949,331 A | 9/1999 | Schofield et al. |
| 5,978,017 A | 11/1999 | Tino |
| 6,002,544 A | 12/1999 | Yatsu |
| 6,013,372 A | 1/2000 | Hayakawa et al. |
| 6,071,606 A | 6/2000 | Yamazaki et al. |
| 6,072,814 A | 6/2000 | Ryan et al. |
| 6,087,953 A | 7/2000 | DeLine et al. |
| 6,097,023 A | 8/2000 | Schofield et al. |
| 6,117,193 A | 9/2000 | Glenn |
| 6,124,886 A | 9/2000 | DeLine et al. |
| 6,151,065 A | 11/2000 | Steed |
| 6,154,306 A | 11/2000 | Varaprasad et al. |
| 6,172,613 B1 | 1/2001 | DeLine et al. |
| 6,176,602 B1 | 1/2001 | Pastrick et al. |
| 6,178,034 B1 | 1/2001 | Allemand et al. |
| 6,193,378 B1 | 2/2001 | Tonar et al. |
| 6,201,642 B1 | 3/2001 | Bos |
| 6,222,447 B1 | 4/2001 | Schofield et al. |
| 6,243,003 B1 | 6/2001 | DeLine et al. |
| 6,250,148 B1 | 6/2001 | Lynam |
| 6,259,475 B1 | 7/2001 | Ramachandran et al. |
| 6,276,821 B1 | 8/2001 | Pastrick et al. |
| 6,278,377 B1 | 8/2001 | DeLine et al. |
| 6,292,311 B1 | 9/2001 | Bohn et al. |
| 6,302,545 B1 | 10/2001 | Schofield et al. |
| 6,313,454 B1 | 11/2001 | Bos et al. |
| 6,320,176 B1 | 11/2001 | Schofield et al. |
| 6,326,613 B1 | 12/2001 | Heslin et al. |
| 6,329,925 B1 | 12/2001 | Skiver et al. |
| 6,341,523 B2 | 1/2002 | Lynam |
| 6,353,392 B1 | 3/2002 | Schofield et al. |
| 6,396,397 B1 | 5/2002 | Bos et al. |
| 6,420,975 B1 | 7/2002 | DeLine et al. |
| 6,428,172 B1 | 8/2002 | Hutzel et al. |
| 6,445,287 B1 | 9/2002 | Schofield et al. |
| 6,454,449 B2 | 9/2002 | Nestell et al. |
| 6,466,136 B2 | 10/2002 | DeLine |
| 6,481,003 B1 | 11/2002 | Maeda |
| 6,483,101 B1 | 11/2002 | Webster |
| 6,498,620 B2 | 12/2002 | Schofield et al. |
| 6,501,387 B2 | 12/2002 | Skiver et al. |
| 6,523,964 B2 | 2/2003 | Schofield et al. |
| 6,535,242 B1 | 3/2003 | Strumolo et al. |
| 6,559,435 B2 | 5/2003 | Schofield et al. |
| 6,559,439 B1 | 5/2003 | Tsuchida et al. |
| 6,587,152 B1 | 7/2003 | Sharp et al. |
| 6,590,658 B2 | 7/2003 | Case et al. |
| 6,593,565 B2 | 7/2003 | Heslin et al. |
| 6,603,612 B2 | 8/2003 | Nakano |
| 6,611,202 B2 | 8/2003 | Schofield et al. |
| 6,651,187 B2 | 11/2003 | Lacey, III |
| 6,654,187 B2 | 11/2003 | Ning |
| 6,690,268 B2 | 2/2004 | Schofield et al. |
| 6,717,610 B1 | 4/2004 | Bos et al. |
| 6,757,109 B2 | 6/2004 | Bos |
| 6,768,422 B2 | 7/2004 | Schofield et al. |
| 6,774,356 B2 | 8/2004 | Heslin |
| 6,795,237 B1 | 9/2004 | Marinelli |
| 6,805,767 B2 | 10/2004 | Shinomiya |
| 6,806,452 B2 | 10/2004 | Bos et al. |
| 6,822,563 B2 | 11/2004 | Bos et al. |
| 6,824,281 B2 | 11/2004 | Schofield et al. |
| 6,831,261 B2 | 12/2004 | Schofield et al. |
| 6,891,563 B2 | 5/2005 | Schofield et al. |
| 6,897,432 B2 | 5/2005 | Schmidtke et al. |
| 6,946,978 B2 | 9/2005 | Schofield |
| 6,953,253 B2 | 10/2005 | Schofield et al. |
| 6,968,736 B2 | 11/2005 | Lynam |
| 6,977,619 B2 | 12/2005 | March et al. |
| 7,004,593 B2 | 2/2006 | Weller et al. |
| 7,004,606 B2 | 2/2006 | Schofield |
| 7,005,974 B2 | 2/2006 | McMahon et al. |

(56) References Cited

U.S. PATENT DOCUMENTS

| | | |
|---|---|---|
| 7,015,944 B2 | 3/2006 | Holz et al. |
| 7,031,075 B2 | 4/2006 | Tsuji |
| 7,038,577 B2 | 5/2006 | Pawlicki et al. |
| 7,095,123 B2 | 8/2006 | Prior |
| 7,095,572 B2 | 8/2006 | Lee et al. |
| 7,111,996 B2 * | 9/2006 | Seger .................. H04N 13/239 396/419 |
| 7,123,168 B2 | 10/2006 | Schofield |
| 7,188,963 B2 | 3/2007 | Schofield et al. |
| 7,205,904 B2 | 4/2007 | Schofield |
| 7,215,479 B1 | 5/2007 | Bakin |
| 7,255,451 B2 | 8/2007 | McCabe et al. |
| 7,262,406 B2 | 8/2007 | Heslin et al. |
| 7,265,342 B2 | 9/2007 | Heslin et al. |
| 7,268,957 B2 | 9/2007 | Frenzel et al. |
| 7,289,037 B2 | 10/2007 | Uken et al. |
| 7,311,406 B2 | 12/2007 | Schofield et al. |
| 7,325,934 B2 | 2/2008 | Schofield et al. |
| 7,339,149 B1 | 3/2008 | Schofield et al. |
| 7,344,261 B2 | 3/2008 | Schofield et al. |
| 7,355,524 B2 | 4/2008 | Schofield |
| 7,370,983 B2 | 5/2008 | DeWind et al. |
| 7,388,182 B2 | 6/2008 | Schofield et al. |
| 7,391,458 B2 | 6/2008 | Sakamoto |
| 7,402,786 B2 | 7/2008 | Schofield et al. |
| 7,419,315 B2 | 9/2008 | Hirata et al. |
| 7,420,159 B2 | 9/2008 | Heslin et al. |
| 7,423,248 B2 | 9/2008 | Schofield et al. |
| 7,423,665 B2 | 9/2008 | Ray et al. |
| 7,425,076 B2 | 9/2008 | Schofield et al. |
| 7,453,509 B2 | 11/2008 | Losehand et al. |
| 7,480,149 B2 | 1/2009 | DeWard et al. |
| 7,526,103 B2 | 4/2009 | Schofield et al. |
| 7,533,998 B2 | 5/2009 | Schofield et al. |
| 7,536,316 B2 | 5/2009 | Ozer et al. |
| 7,538,316 B2 | 5/2009 | Heslin et al. |
| 7,551,103 B2 | 6/2009 | Schofield |
| 7,579,939 B2 | 8/2009 | Schofield et al. |
| 7,599,134 B2 | 10/2009 | Bechtel et al. |
| 7,616,781 B2 | 11/2009 | Schofield et al. |
| 7,655,894 B2 | 2/2010 | Schofield et al. |
| 7,679,498 B2 | 3/2010 | Pawlicki et al. |
| 7,697,027 B2 | 4/2010 | McMahon et al. |
| 7,728,721 B2 | 6/2010 | Schofield et al. |
| 7,768,574 B2 | 8/2010 | Humpston |
| 7,877,175 B2 | 1/2011 | Higgins-Luthman |
| 7,888,629 B2 | 2/2011 | Heslin et al. |
| 7,889,086 B2 | 2/2011 | Schafer et al. |
| 7,916,009 B2 | 3/2011 | Schofield et al. |
| 7,918,570 B2 | 4/2011 | Weller et al. |
| 7,946,505 B2 | 5/2011 | Lynam et al. |
| 7,965,336 B2 | 6/2011 | Bingle et al. |
| 7,972,045 B2 | 7/2011 | Schofield |
| 7,994,462 B2 | 8/2011 | Schofield et al. |
| 8,063,759 B2 | 11/2011 | Bos et al. |
| 8,064,146 B2 | 11/2011 | Iwasaki |
| 8,070,332 B2 | 12/2011 | Higgins-Luthman et al. |
| 8,090,153 B2 | 1/2012 | Schofield et al. |
| 8,120,652 B2 | 2/2012 | Bechtel et al. |
| 8,142,059 B2 | 3/2012 | Higgins-Luthman et al. |
| 8,162,518 B2 | 4/2012 | Schofield |
| 8,179,437 B2 | 5/2012 | Schofield et al. |
| 8,192,095 B2 | 6/2012 | Kortan et al. |
| 8,194,133 B2 | 6/2012 | DeWind et al. |
| 8,203,440 B2 | 6/2012 | Schofield et al. |
| 8,222,588 B2 | 7/2012 | Schofield et al. |
| 8,223,203 B2 | 7/2012 | Ohsumi et al. |
| 8,239,086 B2 | 8/2012 | Higgins-Luthman |
| 8,254,011 B2 | 8/2012 | Baur et al. |
| 8,256,821 B2 | 9/2012 | Lawlor et al. |
| 8,289,142 B2 | 10/2012 | Pawlicki et al. |
| 8,294,608 B1 | 10/2012 | Lynam |
| 8,314,689 B2 | 11/2012 | Schofield et al. |
| 8,318,512 B2 | 11/2012 | Shah et al. |
| 8,324,552 B2 | 12/2012 | Schofield et al. |
| 8,325,986 B2 | 12/2012 | Schofield et al. |
| 8,339,453 B2 | 12/2012 | Blake, III et al. |
| 8,355,839 B2 | 1/2013 | Schofield et al. |
| 8,376,595 B2 | 2/2013 | Higgins-Luthman |
| 8,386,114 B2 | 2/2013 | Higgins-Luthman |
| 8,405,725 B2 | 3/2013 | McMahon et al. |
| 8,405,726 B2 | 3/2013 | Schofield et al. |
| 8,451,332 B2 | 5/2013 | Rawlings |
| 8,513,590 B2 | 8/2013 | Heslin et al. |
| 8,529,075 B2 | 9/2013 | Yamada et al. |
| 8,531,278 B2 | 9/2013 | DeWard et al. |
| 8,534,887 B2 | 9/2013 | DeLine |
| 8,542,451 B2 | 9/2013 | Lu et al. |
| 8,548,315 B2 | 10/2013 | Okuda |
| 8,629,768 B2 | 1/2014 | Bos et al. |
| 8,665,079 B2 | 3/2014 | Pawlicki et al. |
| 8,743,203 B2 | 6/2014 | Karner |
| 8,763,970 B2 | 7/2014 | Mordau et al. |
| 8,851,690 B2 | 10/2014 | Uken |
| 8,944,655 B2 | 2/2015 | Verrat-Debailleul |
| 9,150,165 B1 | 10/2015 | Fortin |
| 9,156,403 B2 | 10/2015 | Rawlings |
| 9,193,308 B2 | 11/2015 | Okuda |
| 9,266,474 B2 | 2/2016 | DeWard et al. |
| 9,277,104 B2 | 3/2016 | Sesti et al. |
| 9,338,334 B2 | 5/2016 | Lu et al. |
| 9,380,219 B2 | 6/2016 | Salomonsson et al. |
| 9,451,138 B2 | 9/2016 | Winden et al. |
| 9,487,159 B2 | 11/2016 | Achenbach |
| 9,497,368 B1 | 11/2016 | Winden et al. |
| 9,596,387 B2 | 3/2017 | Achenbach et al. |
| 9,630,570 B2 | 4/2017 | Salomonsson et al. |
| 9,635,230 B2 | 4/2017 | Winden et al. |
| 9,871,971 B2 | 1/2018 | Wang et al. |
| 9,878,679 B2 | 1/2018 | Salomonsson et al. |
| 9,883,088 B2 | 1/2018 | Winden et al. |
| 10,033,934 B2 | 7/2018 | Wang et al. |
| 10,046,716 B2 | 8/2018 | Okuda et al. |
| 10,065,575 B2 | 9/2018 | Salomonsson et al. |
| 10,264,168 B2 | 4/2019 | Winden et al. |
| 10,277,825 B2 | 4/2019 | Wang et al. |
| 2002/0003571 A1 | 1/2002 | Schofield |
| 2002/0156559 A1 | 10/2002 | Stam et al. |
| 2002/0159270 A1 | 10/2002 | Lynam et al. |
| 2003/0090569 A1 | 5/2003 | Poechmueller |
| 2003/0137595 A1 | 7/2003 | Takachi |
| 2003/0169522 A1 | 9/2003 | Schofield et al. |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0189862 A1 | 9/2004 | Gustavsson et al. |
| 2005/0083590 A1 | 4/2005 | Tanigawa et al. |
| 2005/0104995 A1 | 5/2005 | Spryshak et al. |
| 2005/0141106 A1 | 6/2005 | Lee et al. |
| 2005/0184352 A1 | 8/2005 | Jeong et al. |
| 2005/0190283 A1 | 9/2005 | Ish-Shalom et al. |
| 2005/0232469 A1 | 10/2005 | Schofield et al. |
| 2005/0274883 A1 | 12/2005 | Nagano |
| 2006/0038668 A1 | 2/2006 | DeWard et al. |
| 2006/0049533 A1 | 3/2006 | Kamoshita |
| 2006/0050018 A1 | 3/2006 | Hutzel et al. |
| 2006/0054802 A1 | 3/2006 | Johnston |
| 2006/0056077 A1 | 3/2006 | Johnston |
| 2006/0061008 A1 | 3/2006 | Karner |
| 2006/0065436 A1 | 3/2006 | Gally et al. |
| 2006/0077575 A1 | 4/2006 | Nakai et al. |
| 2006/0103727 A1 | 5/2006 | Tseng |
| 2006/0125919 A1 | 6/2006 | Camilleri et al. |
| 2006/0171704 A1 | 8/2006 | Bingle et al. |
| 2006/0184297 A1 | 8/2006 | Higgins-Luthman |
| 2006/0202038 A1 | 9/2006 | Wang et al. |
| 2007/0096020 A1 | 5/2007 | Mitsugi et al. |
| 2007/0109406 A1 | 5/2007 | Schofield et al. |
| 2007/0120657 A1 | 5/2007 | Schofield et al. |
| 2007/0221826 A1 | 9/2007 | Bechtel |
| 2007/0279518 A1 | 12/2007 | Apel et al. |
| 2008/0024833 A1 | 1/2008 | Kawasaki |
| 2008/0024883 A1 | 1/2008 | Iwasaki |
| 2008/0043105 A1 | 2/2008 | Kallhammer et al. |

(56) References Cited

U.S. PATENT DOCUMENTS

| | | | |
|---|---|---|---|
| 2008/0121034 A1* | 5/2008 | Lynam | B60H 1/00785 73/335.05 |
| 2008/0247751 A1 | 10/2008 | Lang et al. | |
| 2008/0252882 A1 | 10/2008 | Kesterson | |
| 2009/0010494 A1 | 1/2009 | Bechtel et al. | |
| 2009/0046150 A1 | 2/2009 | Hayakawa et al. | |
| 2009/0085755 A1* | 4/2009 | Schafer | B60R 11/04 340/602 |
| 2009/0208058 A1 | 8/2009 | Schofield et al. | |
| 2009/0244361 A1 | 10/2009 | Gebauer et al. | |
| 2009/0295181 A1* | 12/2009 | Lawlor | B60R 1/12 296/1.11 |
| 2010/0103308 A1 | 4/2010 | Butterfield et al. | |
| 2010/0110192 A1 | 5/2010 | Johnston et al. | |
| 2010/0118146 A1 | 5/2010 | Schofield et al. | |
| 2010/0134616 A1 | 6/2010 | Seger et al. | |
| 2010/0165468 A1 | 7/2010 | Yamada et al. | |
| 2010/0279438 A1 | 11/2010 | An et al. | |
| 2010/0279439 A1 | 11/2010 | Shah et al. | |
| 2010/0283581 A1 | 11/2010 | Heigl | |
| 2011/0025850 A1 | 2/2011 | Maekawa et al. | |
| 2011/0035120 A1 | 2/2011 | Taylor et al. | |
| 2011/0163904 A1* | 7/2011 | Alland | B60R 1/00 342/1 |
| 2011/0233248 A1 | 9/2011 | Flemming et al. | |
| 2011/0298968 A1 | 12/2011 | Tseng et al. | |
| 2012/0008129 A1 | 1/2012 | Lu et al. | |
| 2012/0013741 A1* | 1/2012 | Blake | B60R 11/00 348/148 |
| 2012/0069185 A1 | 3/2012 | Stein | |
| 2012/0075471 A1 | 3/2012 | Seger et al. | |
| 2012/0081550 A1 | 4/2012 | Sewell | |
| 2012/0182425 A1 | 7/2012 | Higgins-Luthman et al. | |
| 2012/0207461 A1 | 8/2012 | Okuda | |
| 2012/0265416 A1 | 10/2012 | Lu | |
| 2013/0002873 A1 | 1/2013 | Hess | |
| 2013/0044021 A1 | 2/2013 | Lynam | |
| 2014/0000804 A1 | 1/2014 | Looi et al. | |
| 2014/0015977 A1 | 1/2014 | Taylor | |
| 2014/0016919 A1 | 1/2014 | Okuda | |
| 2014/0022657 A1 | 1/2014 | Lu et al. | |
| 2014/0043465 A1 | 2/2014 | Salomonsson | |
| 2014/0160284 A1 | 6/2014 | Achenbach et al. | |
| 2014/0226012 A1 | 8/2014 | Achenbach et al. | |
| 2015/0015713 A1 | 1/2015 | Wang | |
| 2015/0042798 A1 | 2/2015 | Takeda et al. | |
| 2015/0251605 A1 | 9/2015 | Uken et al. | |
| 2017/0187931 A1 | 6/2017 | Onishi et al. | |

FOREIGN PATENT DOCUMENTS

| | | | | |
|---|---|---|---|---|
| CN | 101681530 A | 3/2010 | | |
| CN | 101799614 A | 8/2010 | | |
| DE | 102008044003 | 5/2010 | | |
| DE | 102010023593 | 12/2011 | | |
| DE | 102010023593 A1 | * 12/2011 | | B60S 1/0837 |
| EP | 0889801 | 1/1999 | | |
| EP | 1271214 A1 | 1/2003 | | |
| EP | 1351316 A2 | 10/2003 | | |
| EP | 1605520 A1 | 12/2005 | | |
| EP | 1025702 | 11/2006 | | |
| EP | 1504276 | 8/2012 | | |
| JP | 08084277 | 3/1996 | | |
| JP | 2006-293100 A | 10/2006 | | |
| JP | 2006-350372 A | 12/2006 | | |
| JP | 2007243550 | 9/2007 | | |
| JP | 2010042703 A | * 2/2010 | | |
| WO | 2001/044850 A2 | 6/2001 | | |
| WO | 2004/010679 A2 | 1/2004 | | |
| WO | 2006/029995 A1 | 3/2006 | | |
| WO | 2006/029996 A1 | 3/2006 | | |
| WO | 2007/053404 A2 | 5/2007 | | |
| WO | WO2008024639 | 2/2008 | | |
| WO | WO2008127752 | 10/2008 | | |
| WO | WO2009046268 | 4/2009 | | |
| WO | WO2010/111465 | 9/2010 | | |
| WO | 2011/111465 A1 | 9/2011 | | |
| WO | WO2013/019795 | 2/2013 | | |
| WO | WO2013/081984 | 6/2013 | | |
| WO | WO2013/081985 | 6/2013 | | |
| WO | WO2013/123161 | 8/2013 | | |

\* cited by examiner

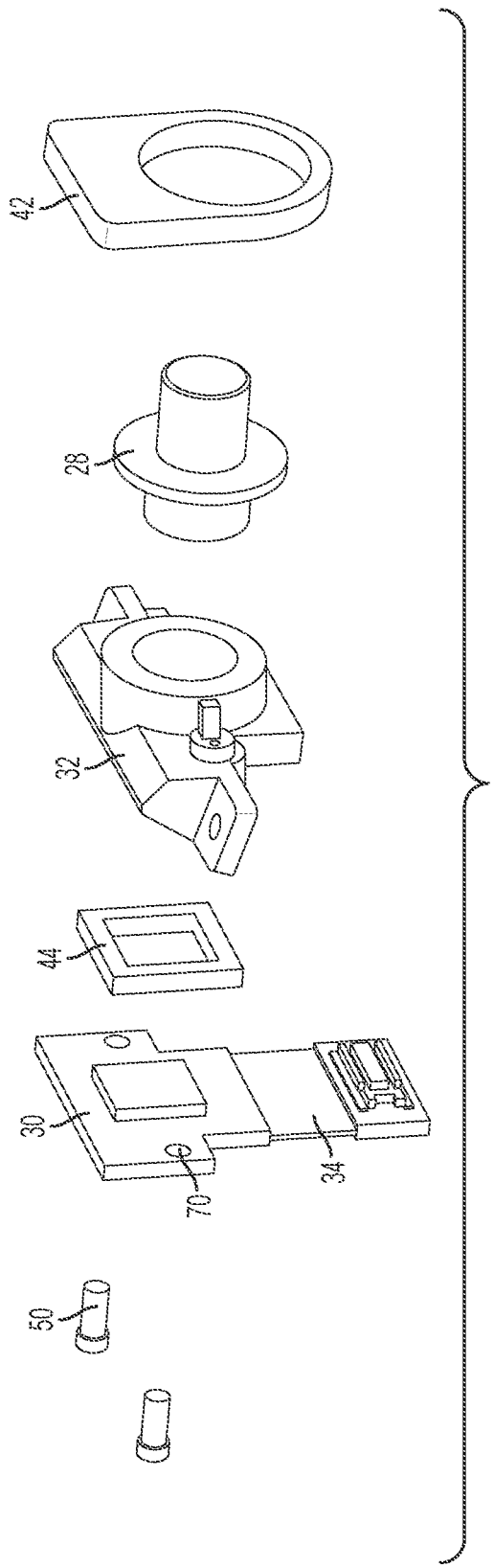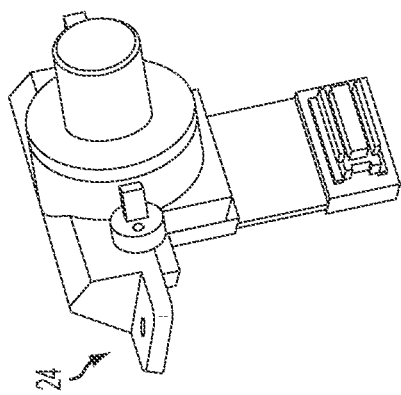

VEHICULAR CAMERA SYSTEM

CROSS REFERENCE TO RELATED APPLICATIONS

The present application is a continuation of U.S. patent application Ser. No. 14/233,507, filed Jul. 31, 2012, now U.S. Pat. No. 9,596,387, which is a 371 U.S. national phase application of PCT Application No. PCT/US2012/048993, filed Jul. 31, 2012, which claims the filing benefits of U.S. provisional application Ser. No. 61/583,431, filed Jan. 5, 2012, and Ser. No. 61/514,191, filed Aug. 2, 2011, which are hereby incorporated herein by reference in their entireties.

FIELD OF THE INVENTION

This disclosure relates to vehicles, and more particularly, to a vehicular camera system.

BACKGROUND OF THE INVENTION

Vehicular camera systems can provide vehicle operators with valuable information about driving conditions. For example, a typical vehicle camera system can aid a driver in parking her automobile by alerting her to hazards around her automobile that should be avoided. Other uses for vehicle camera system are also known.

However, front-facing vehicular camera systems may obstruct a driver's field of view and may require space within the vehicle beyond what can readily be provided.

SUMMARY OF THE INVENTION

According to one aspect of this disclosure, a vehicular camera system includes a circuit board that has an opening therein. An imager assembly of the vehicular camera system can include a portion, such as a flexible portion, that extends through the opening in the circuit board.

BRIEF DESCRIPTION OF THE DRAWINGS

The drawings illustrate, by way of example only, embodiments of the present disclosure.

FIGS. 6A-B, 7A-B, 8A-B are perspective views that show a method of assembly of the vehicular camera system;

DETAILED DESCRIPTION OF THE INVENTION

Figure 1:
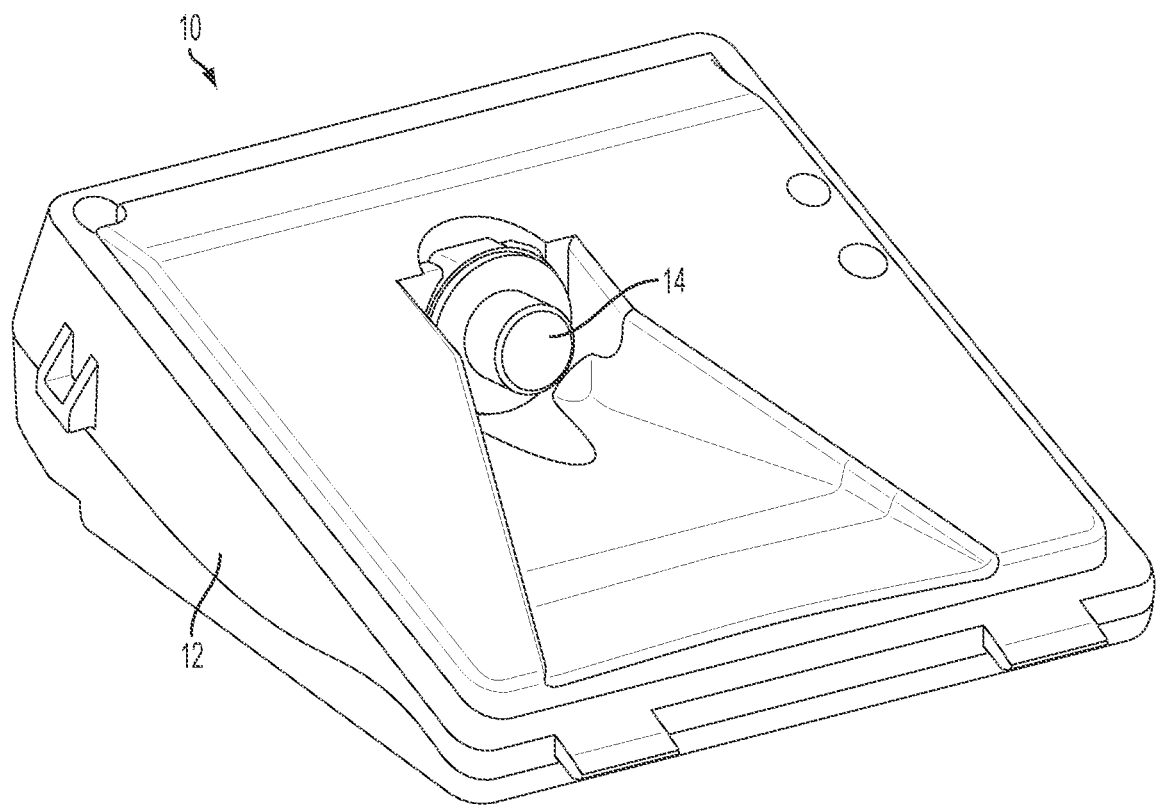
FIG. 1 is a perspective view of a vehicular camera system.

A vehicular camera system can be installed on the inside of the front windshield of a vehicle, such as a car, truck, bus, or van. Such a camera system may be used for a variety of functions such as object detection, lane keeping, and high beam control. FIG. 1 shows an example of a vehicular camera system or module 10 configured to be attached in a front-facing manner to a vehicle. The camera system 10 includes a housing 12 and a lens barrel 14 projecting therefrom.

Figure 2:
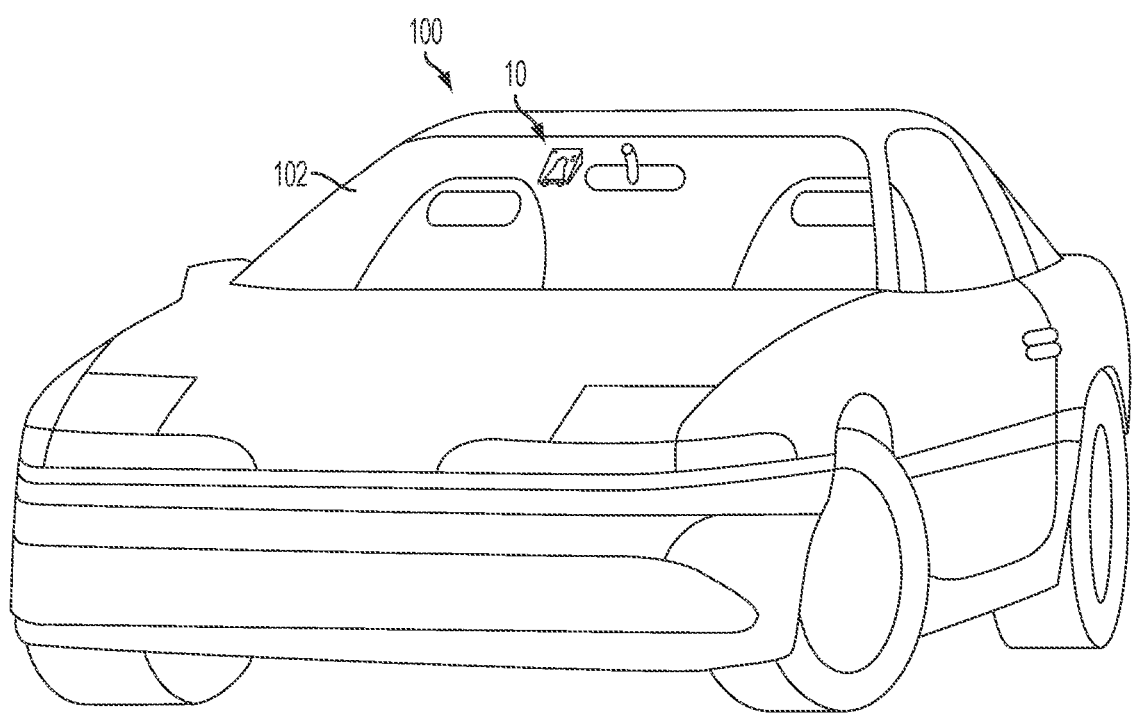
FIG. 2 is a perspective view of a vehicle having the vehicular camera system.

FIG. 2 shows a forward-facing position for a camera system 10 in the vehicle 100. The camera system or module 10 can be attached to the windshield 102, as shown, such as via a frame or bracket that is adhesively attached at the windshield via a plurality of fixing elements or attachment elements. Other positions are also possible. The camera system or camera module of the present invention may utilize aspects of the systems and/or modules described in U.S. Pat. Nos. 7,916,009; 7,888,629; 7,728,721; 7,533,998; 7,536,316; 7,480,149; 7,420,159; 7,289,037; 7,265,342; 7,262,406; 7,004,593; 6,824,281 and/or 6,690,268, and/or U.S. patent application Ser. No. 11/721,406, filed Jun. 11, 2007 and published Dec. 3, 2009 as U.S. Publication No. US-2009-0295181, which are all hereby incorporated herein by reference in their entireties.

Since the camera system 10 uses a portion of the limited amount of space on the windshield 102, which is needed for a clear view of the road and/or placement of other components of the vehicle, the camera housing 12 can be made as small as practical. A height H (see FIG. 4C) of the camera housing 12 tends to have a relatively significant effect on driver and passenger visual perception. As will be discussed below, the components of the camera system 10 can be configured to reduce the height H. In one example, the height H can be reduced to about 28 mm (about 1.1 inches), which is about 15 percent smaller than a comparable camera system.

Figure 3:
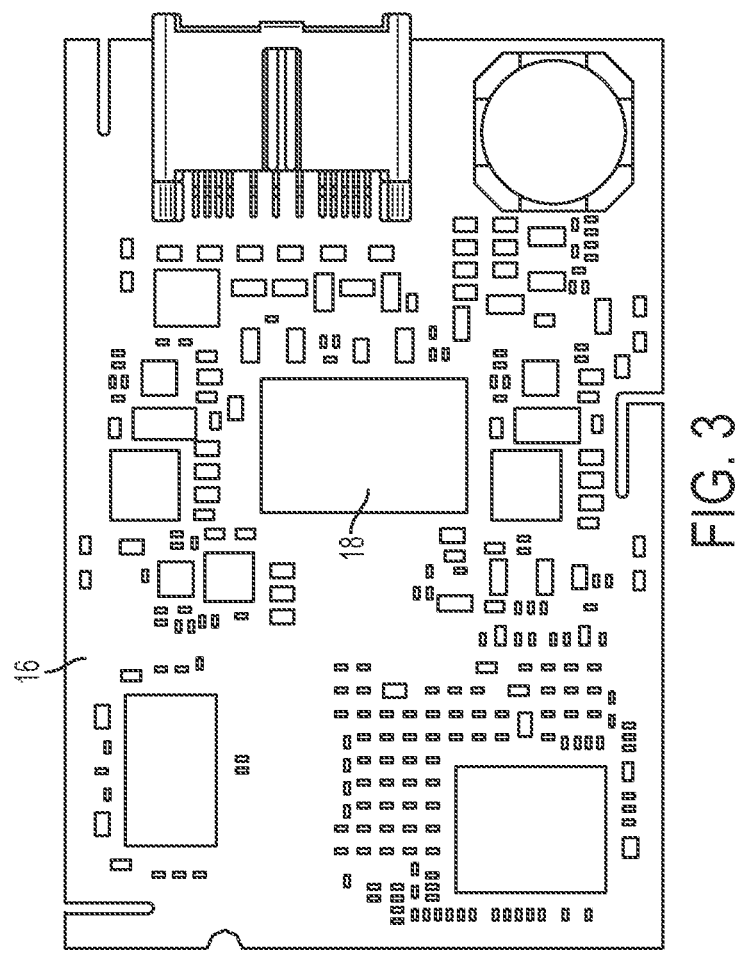
FIG. 3 is a plan view of a main circuit board of the vehicular camera system.

As shown in FIG. 3, the camera system 10 includes a main circuit board 16, such as a printed circuit board (PCB), that has an opening 18, which may be referred to as a hole or a cut-out section. The opening 18 can be approximately centrally located, as depicted, in the main PCB 16, or, in other examples, can be positioned at other locations. The opening 18 is surrounded by material of the main PCB 16. The opening 18 can be formed by any mechanical technique suitable for the material of the main PCB 16, such as cutting, punching, drilling, or milling, or by another technique, such as laser cutting. The opening 18 can be formed during the fabrication process of PCB material for use as PCBs or can be formed subsequently. In the embodiment shown in FIG. 3, the opening 18 has a rectangular shape with rounded inside corners. In other embodiments other shapes, such as elliptical, can be used for the opening 18.

Figure 4A:
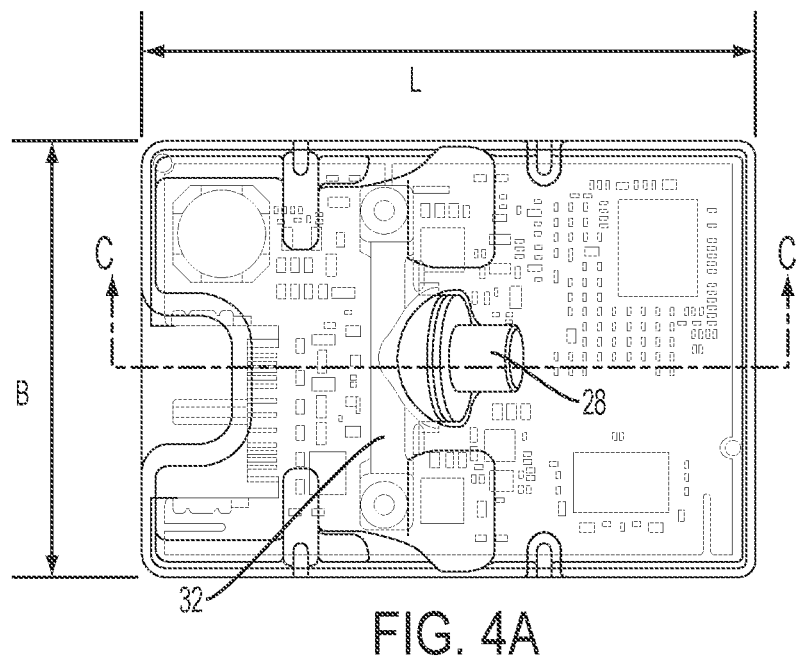
FIG. 4A is a hidden-line top view of the vehicular camera system showing internal components.
Figure 4B:
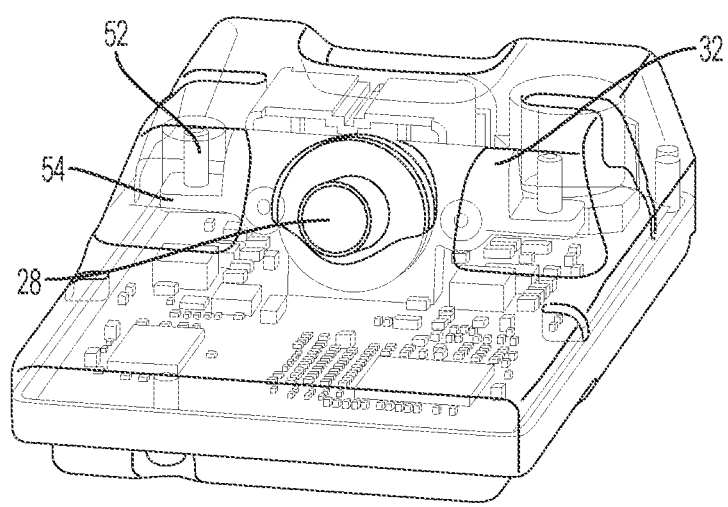
FIG. 4B is a hidden-line perspective view of the vehicular camera system showing internal components.
Figure 4C:
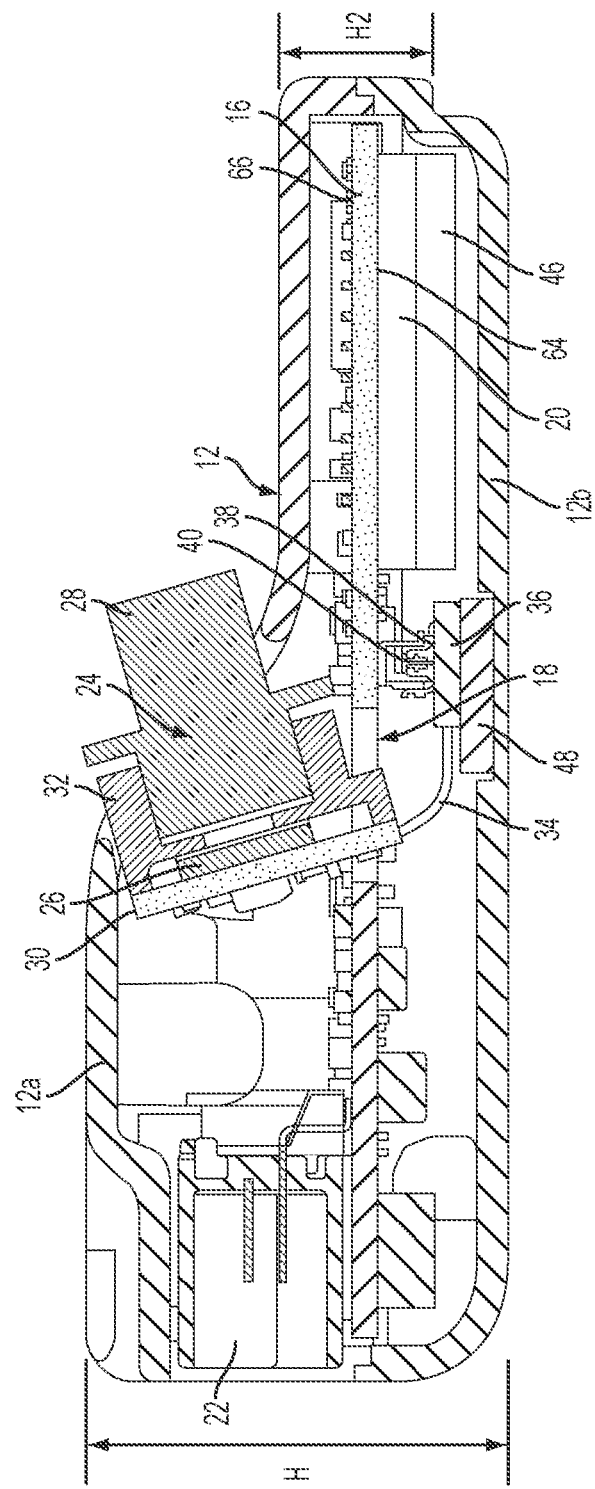
FIG. 4C is a section view of the vehicular camera system along section line C-C of FIG. 4A.

As seen in FIGS. 4A-C, the main PCB 16 is installed extending along a breadth B and length L of the housing 12. The main PCB 16 is dual-sided and has circuitry or electrical components or elements established at or populated at both sides of the PCB. The main PCB 16 supports or includes or carries or has established thereon a digital image processor 20, memory components, power supply components, and a vehicle connector 22, which are electrically operatively coupled together by conductive traces and vias. The processor 20 and memory are cooperatively configured to provide functions such as image processing, object detection, and lane detection. The main PCB 16 can be multilayered.

In the above-mentioned example where the height H of the camera housing 12 is about 28 mm (about 1.1 inches), the breadth B of the housing 12 can be about 58 mm (about 2.3 inches) and the length can be about 85 mm (about 3.3 inches). A forward height H2 of the housing can be about 10 mm (about 0.4 inches). In addition to the 15 percent reduction in height, these dimensions afford as much as a 35 percent reduction in breadth and a 15 percent reduction in length with respect to the comparable camera system.

An imager assembly 24 extends through the opening 18 of the main PCB 16. The imager assembly 24 includes an imager 26, such as an integrated circuit (IC) imager, which receives light directed by a lens 28 positioned in front of the imager 26 to capture a scene in front of the vehicle. The imager 26 can include a charge-coupled device (CCD), a complementary metal-oxide semiconductor (CMOS) active-pixel sensor (APS), or similar device. The imager 26 is connected to an imager circuit board 30 (such as a PCB), and a lens holder 32 mechanically fixes the lens 28 to the imager PCB 30. The imager PCB 30 and the lens holder 32 extend along the height H of the housing 12 partially through the opening 18 of the main PCB 16, which can allow for the above-mentioned reduction in the height H of the housing 12. The imager PCB 30 extending along the height H need not be parallel to the height H, and the imager PCB 30 can be tilted at an angle, as depicted, resulting in the other components of the imager assembly 24 being tilted as well. The magnitude of such angle can be selected to allow for the height H of the housing 12 to meet an operational constraint. For example, when a taller housing 12 is acceptable, then the angle can be 90 degrees, meaning that the imager PCB 30 extends parallel to the height H or perpendicular to the main PCB 16. When a shorter housing 12 is needed, the magnitude of the angle can be reduced, thereby tilting the imager PCB 30 with respect to the main PCB 16 so that the imager PCB 30 is not perpendicular to the main PCB 16 (as depicted). The location in the vehicle of the camera system 10 can be taken into account when determining the angle of the imager PCB 30. Geometric factors such as windshield slope and shape of the housing 12 as well as the desired field of view of the camera system 10 can be taken into account. In this example, the angle is about 75 degrees. In other examples, the angle can be smaller, such as 60 degrees, or larger.

The imager PCB 30 also includes a flexible portion 34 that terminates at a small rigid PCB terminator 36. The flexible portion 34 can include any of a flexible connector (also known as a flex connector), a flexible PCB, a ribbon cable, wires, or the like. The flexible portion 34 includes conductors that electrically connect the components of the imager PCB 30 to the terminator 36. The terminator 36 has an electrical connector 38 that attaches to a mating electrical connector 40 on the underside 64 of the main PCB 16. The flexible connector or ribbon cable provides image signals/data (such as LVDS signals or the like) to the circuitry of the main PCB. Thus, the imager 26 and the main PCB 16 are operatively connected to allow image signals/data captured by the imager 26 to be received at the processor 20. The underside 64 is located opposite a top side 66 of the main PCB 16 on which the lens 28 is positioned. The electrical connector 38 can be removably attachable to the electrical connector 40.

Figure 5A:
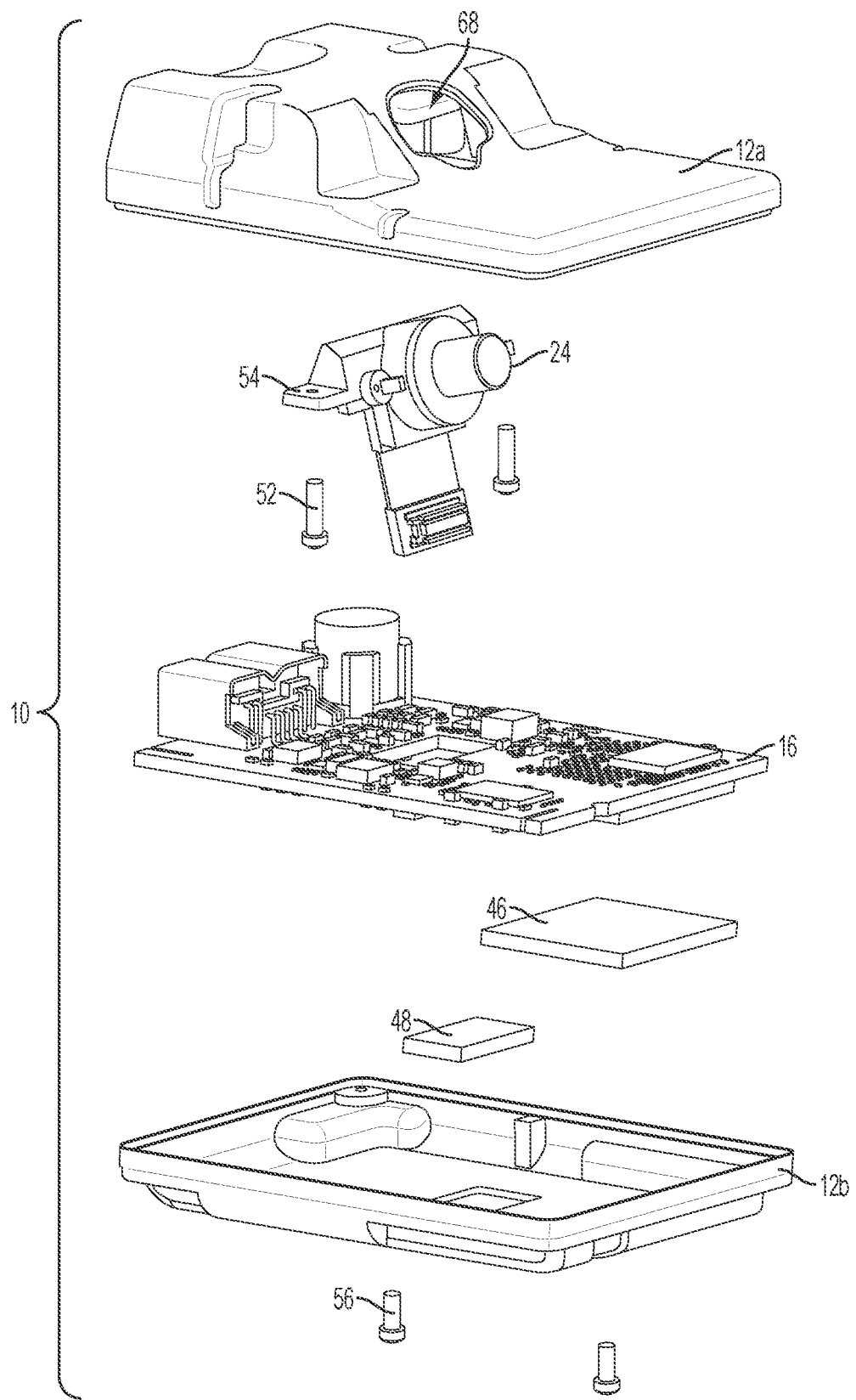
FIG. 5A is an exploded view of the vehicular camera system.
Figure 5B:
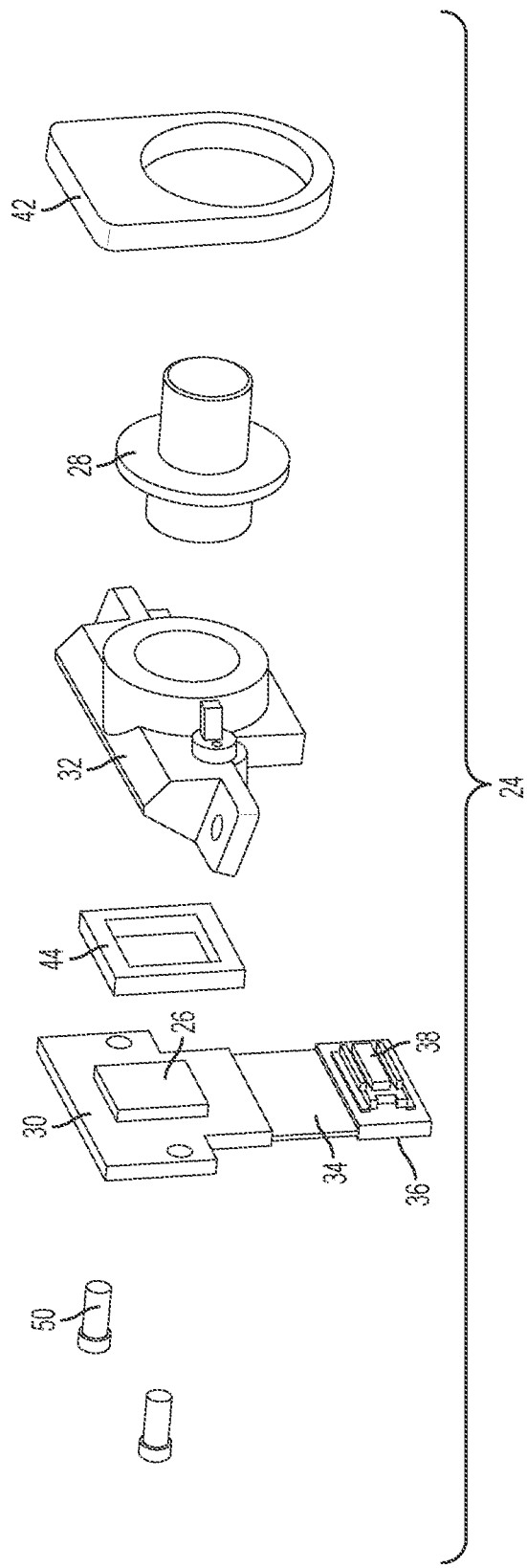
FIG. 5B is an exploded view of the imager assembly.

FIG. 5A shows an exploded view of the camera system 10, where it will be seen that the housing 12 can be subdivided into an upper cover 12a and a lower cover 12b. FIG. 5B shows an exploded view of the imager assembly 24. The housing upper cover 12a includes a lens opening 68 through which the lens 28 of the imager assembly 24 receives light.

Protective components can be installed within the housing 12 and can include a lens gasket 42, an imager resilient member 44, a heat sink 46, and a connector resilient member 48. The lens gasket 42 serves to reduce or eliminate infiltration of dust, particulate or moisture into the imager assembly 24 between the lens 28 and the lens holder 32. The heat sink 46 is positioned on the processor 20 to collect and dissipate heat generated by the processor 20. Each of the resilient members 44, 48 can include a foam cushion, or the like. The imager resilient member 44 is of rectangular shape with a central rectangular opening sized to accommodate the imager 26. The imager resilient member 44 surrounds the imager 26 and is sandwiched between the imager PCB 30 and the lens holder 32, and serves to reduce or eliminate infiltration of dust, particulate, or moisture past the imager PCB 30 and the lens holder 32 to protect the imager 26.

As shown in FIG. 4C, the connector resilient member 48 is sandwiched between the PCB terminator 36 that carries the electrical connector 38 and the lower cover 12b of the housing 12, and accordingly, the connector resilient member 48 transmits force from the lower cover 12b to the electrical connector 38 to ensure that the electrical connector 38 is firmly seated to the mating electrical connector 40 of the main PCB 16 in order to maintain a sound electrical connection between the imager PCB 30 and the main PCB 16. In this example, the thickness of the connector resilient member 48 is selected to be larger than the space between the lower cover 12b of the housing and the terminator 36, so that the resiliency of the connector resilient member 48 provides an effective seating force.

FIGS. 6A-B, 7A-B and 8A-B show a method of assembling the camera system 10.

First, as shown in FIGS. 6A and 6B, the imager assembly 24 is assembled. The lens 28 is screwed into the lens holder 32, or alternatively another technique, such as adhesive bonding, is used to mount the lens 28 to the lens holder 32. The lens holder 32 is fixed to the imager PCB 30 using, for example, one or more fasteners 50 (e.g., screws) that extend through holes 70 in the imager PCB 30 and mate with threaded holes in the lens holder 32. The lens gasket 42 is slid over and around the lens 28.

Figure 7B:
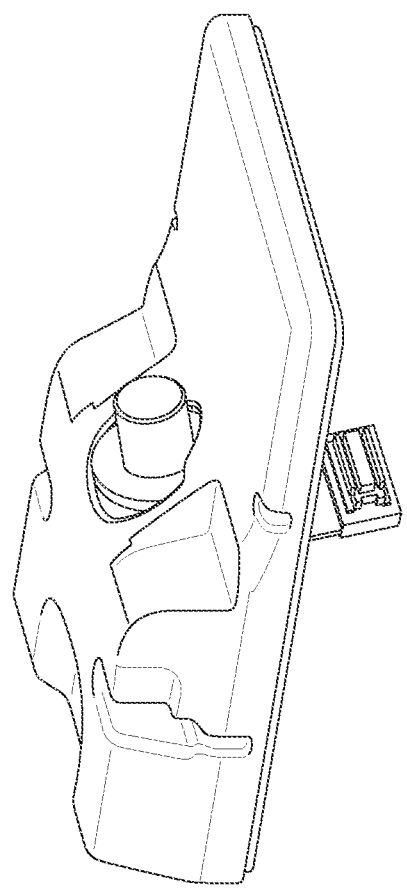
Figure 7A:
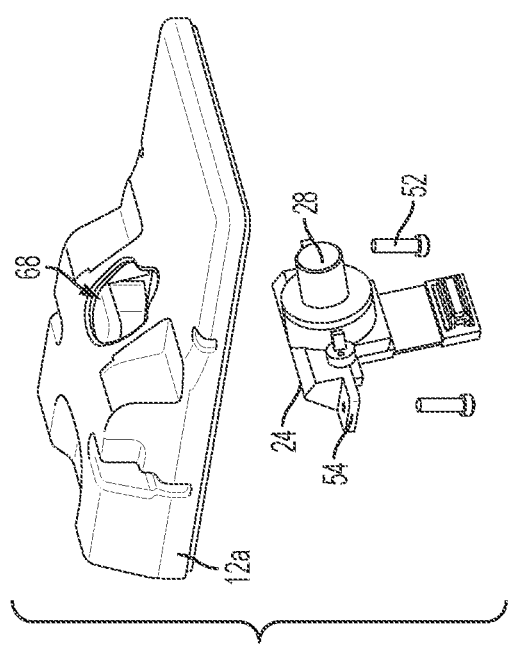

Next, as shown in FIGS. 7A and 7B, the imager assembly 24 is placed in the housing upper cover 12a such that the lens 28 is aligned with the lens opening 68. The imager assembly 24 is mounted to the inside of the housing upper cover 12a by, for example, one or more fasteners 52 (such as, for example, screws or the like), which can mate with corresponding features (such as, for example, threaded holes or the like) in the upper cover 12a. The lens holder 32 (see also FIG. 4B) includes wings 54 on either side having openings for receiving the fasteners 52.

Figure 8B:
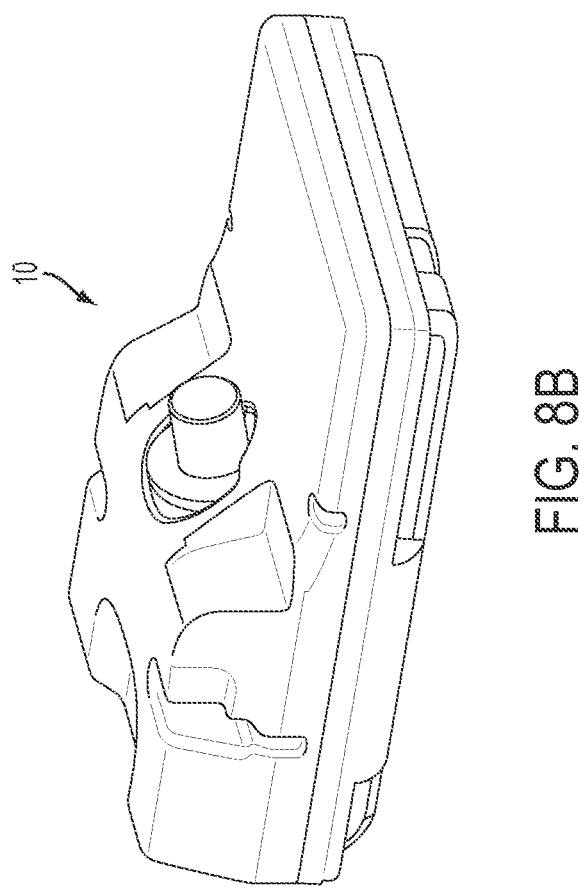
Figure 8A:
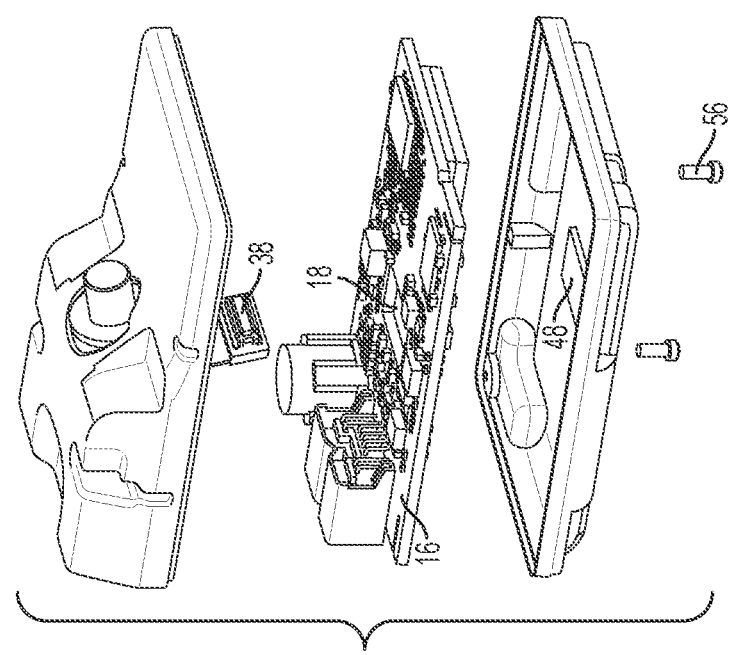

Next, the main PCB 16 is brought into alignment with the housing upper cover 12a and is fitted so that a portion of the imager assembly 24 extends through the opening 18 of the main PCB 16, as seen best in FIG. 4C. The connector resilient member 48 is positioned on the inside of the housing lower cover 12b, and can be held in place using an adhesive or other technique. The connector 38 is then extended through the opening 18 in the main PCB 16 (as can be seen in FIG. 8A), aligned with the mating connector 40 on the underside 64 of the main PCB 16 by virtue of the flexible portion 34, and mated with the connector 40. The electrical connection between the imager PCB 30 and the main PCB 16 is made. The housing lower cover 12b is then fastened to the housing upper cover 12a via, for example, one or more fasteners 56, which compresses the connector resilient member 48 to firmly seat the camera-side connector 38 on the mating main PCB-side connector 40.

In other examples, the method steps described above can be performed in an order different from that described.

Figure 9:
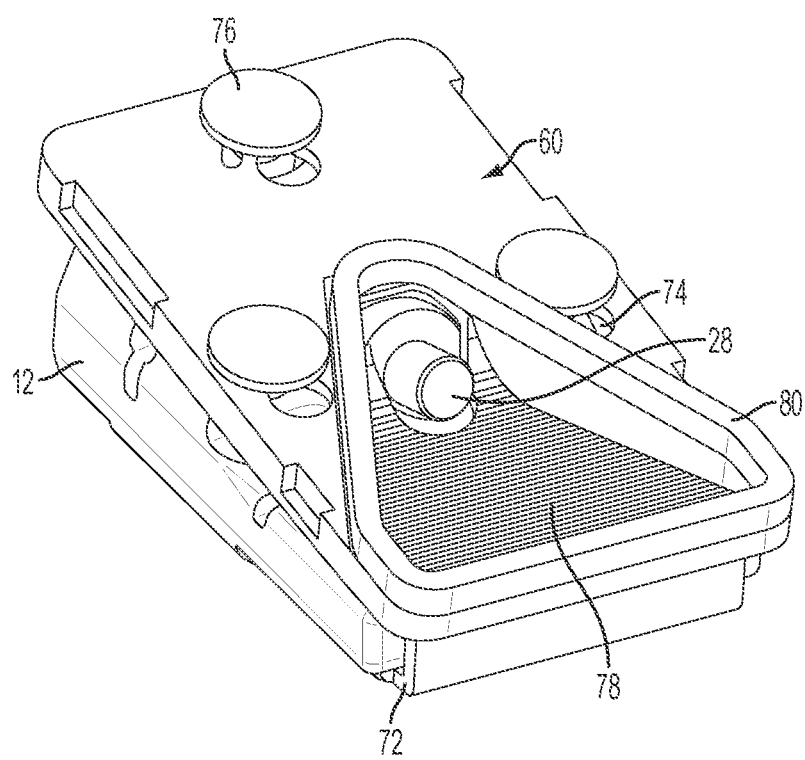
FIG. 9 is a perspective view of a vehicular camera system with a stray light shield.

FIG. 9 shows a frame or bracket 60 that can be attached to the camera housing 12 and that provides a stray light shield or light baffle or the like. The stray light shield can function to reduce capture by the camera lens 28 of stray light or glare that may, for example, be reflected off of the windshield. The frame or bracket 60 can be attached to the housing 12 by, for example, a mechanical clip-and-notch structure, referenced at 72, whereby the housing 12 of the accessory or camera module 10 may modularly locate and/or attach at the frame or bracket 60 with the frame or bracket attached at the windshield via fixing elements or attachment elements 76. Narrowing slots 74 can be provided in the frame or bracket to removably mate with knobs or structure on the backs of the fixing elements 76. The pads of fixing elements 76 can be attached to the vehicle windshield by way of an adhesive (and such as by utilizing aspects of the modules described in U.S. patent application Ser. No. 11/721,406, filed Jun. 11, 2007 and published Dec. 3, 2009 as U.S. Publication No. US-2009-0295181, which is hereby incorporated herein by reference in its entirety). Alternatively, the pads can be suction pads. The stray light shield of the frame or bracket 60 may comprise ridges 78 positioned (such as below and in front of the lens) to reduce the amount of light reflected into the lens 28 (such as by utilizing aspects of the vision systems described in U.S. provisional application Ser. No. 61/600,205, filed Feb. 17, 2012, which is hereby incorporated herein by reference in its entirety). Further, a shield gasket 80 can be positioned on the frame or bracket 60 around the lens 28 to reduce incursion of dust, particulate, or moisture into the vicinity of the lens 28. The gasket may utilize aspects of the gaskets described in U.S. patent application Ser. No. 12/393,223, filed Feb. 26, 2009, abandoned, which is hereby incorporated herein by reference in its entirety.

Figure 10:
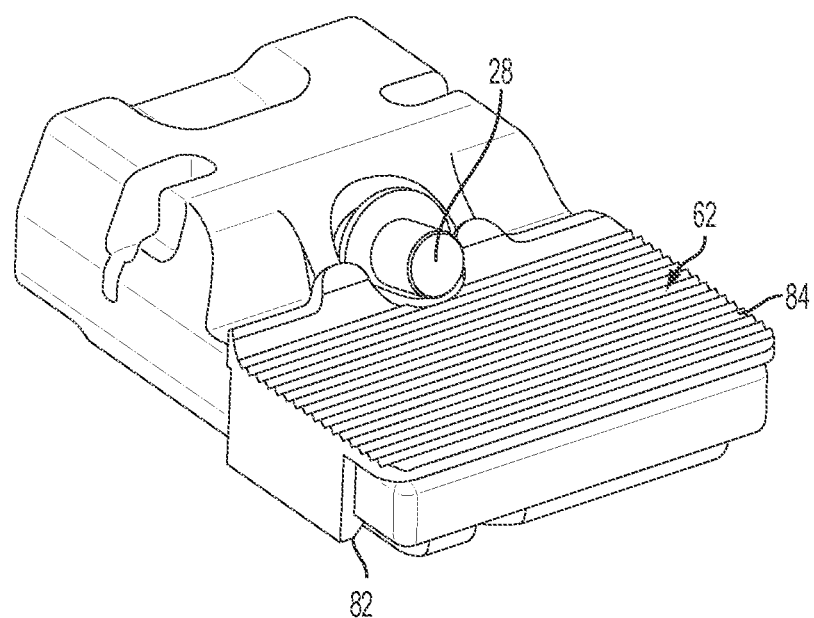
FIG. 10 is a perspective view of a vehicular camera system with another stray light shield.

FIG. 10 shows another stray light shield 62 that can be attached to or established at the camera housing 12. The stray light shield 62 can function to reduce capture by the camera lens 28 of stray light or glare that may, for example, be reflected off of the windshield. The stray light shield 62 can be attached to the housing 12 by, for example, a mechanical clip-and-notch structure, at 82, and the module (with the stray light shield at the housing) may be mechanically attached to a frame or bracket adhesively attached at the windshield via a plurality of spaced apart fixing elements or attaching elements or the like. The stray light shield 62 can include ridges 84 positioned to reduce the amount of light reflected into the lens 28. The stray light shield may comprise any suitable material, such as a shield that utilizes aspects of the light baffling system of the vision systems described in U.S. provisional application Ser. No. 61/600, 205, filed Feb. 17, 2012, which is hereby incorporated herein by reference in its entirety.

Figure 11:
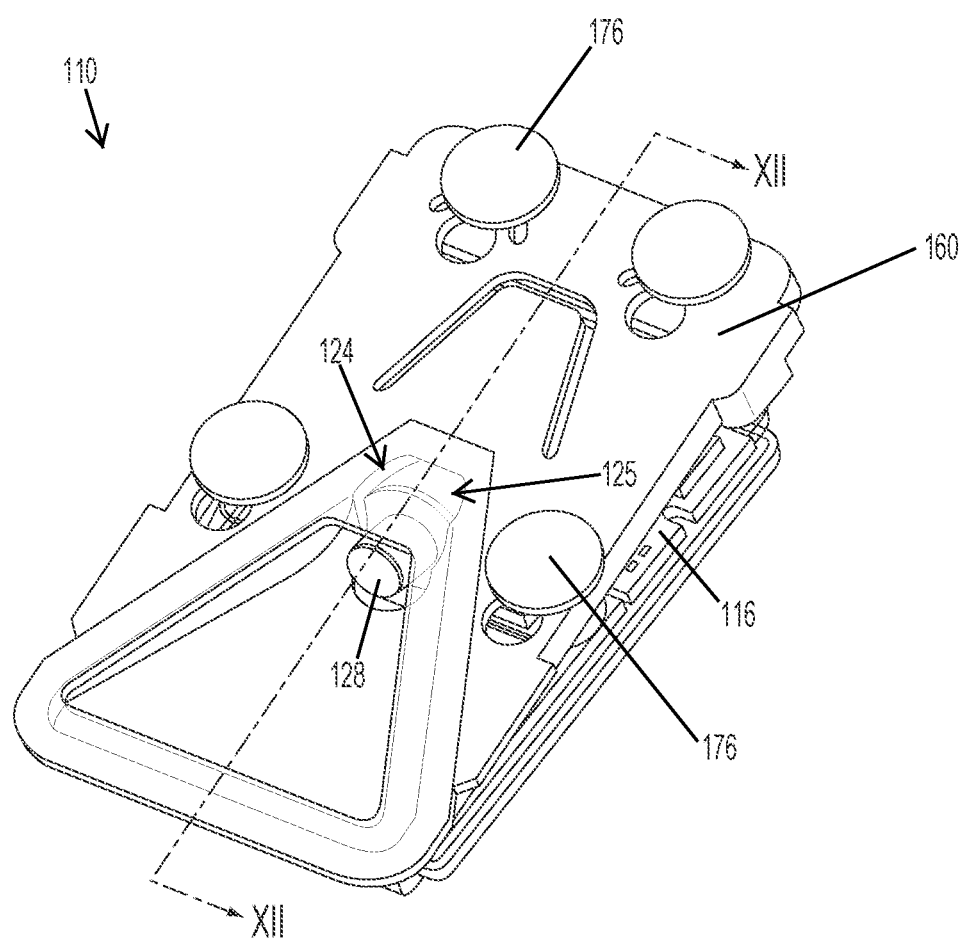
FIG. 11 is a perspective view of another vehicular camera system of the present invention.
Figure 12A:
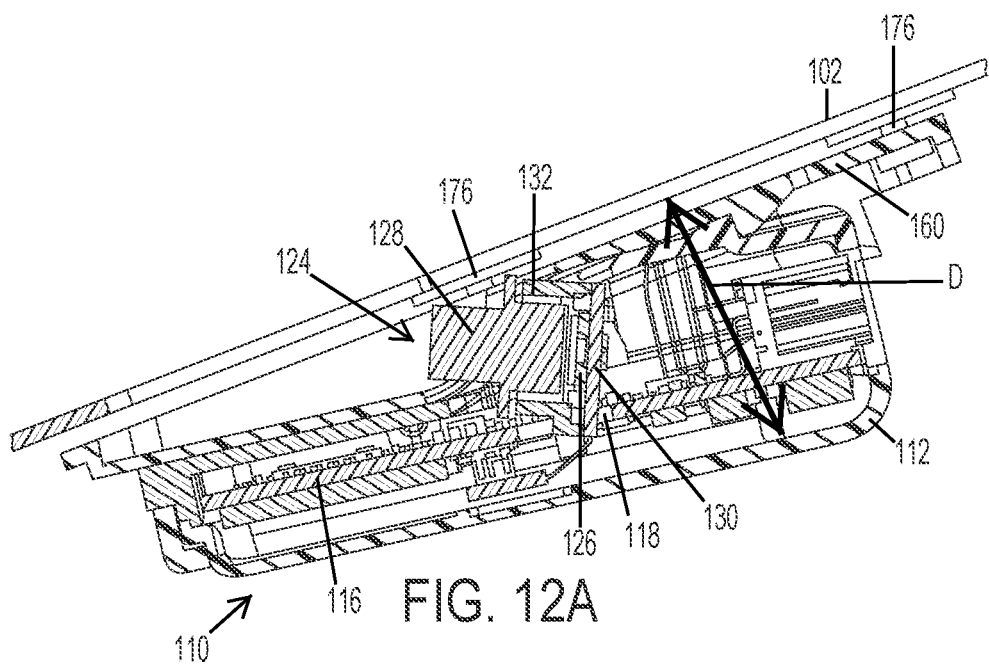
FIGS. 12A and 12B are sectional views taken along the line XII-XII in FIG. 11, showing the camera system mounted at windshields having different windshield angles.
Figure 12B:
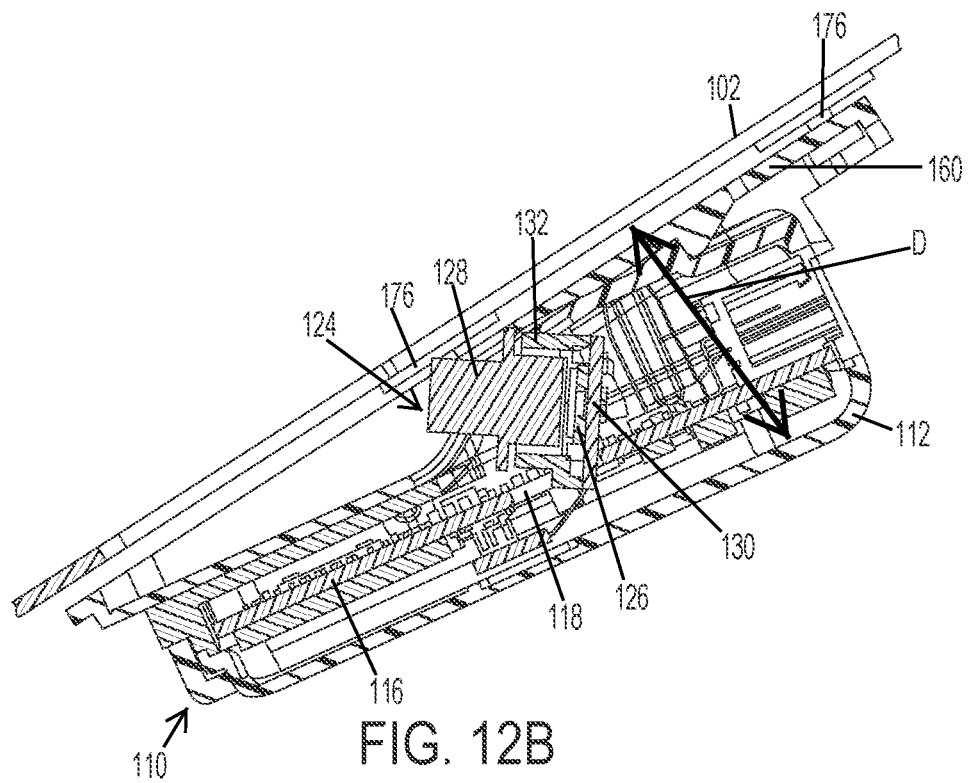
Figure 13:
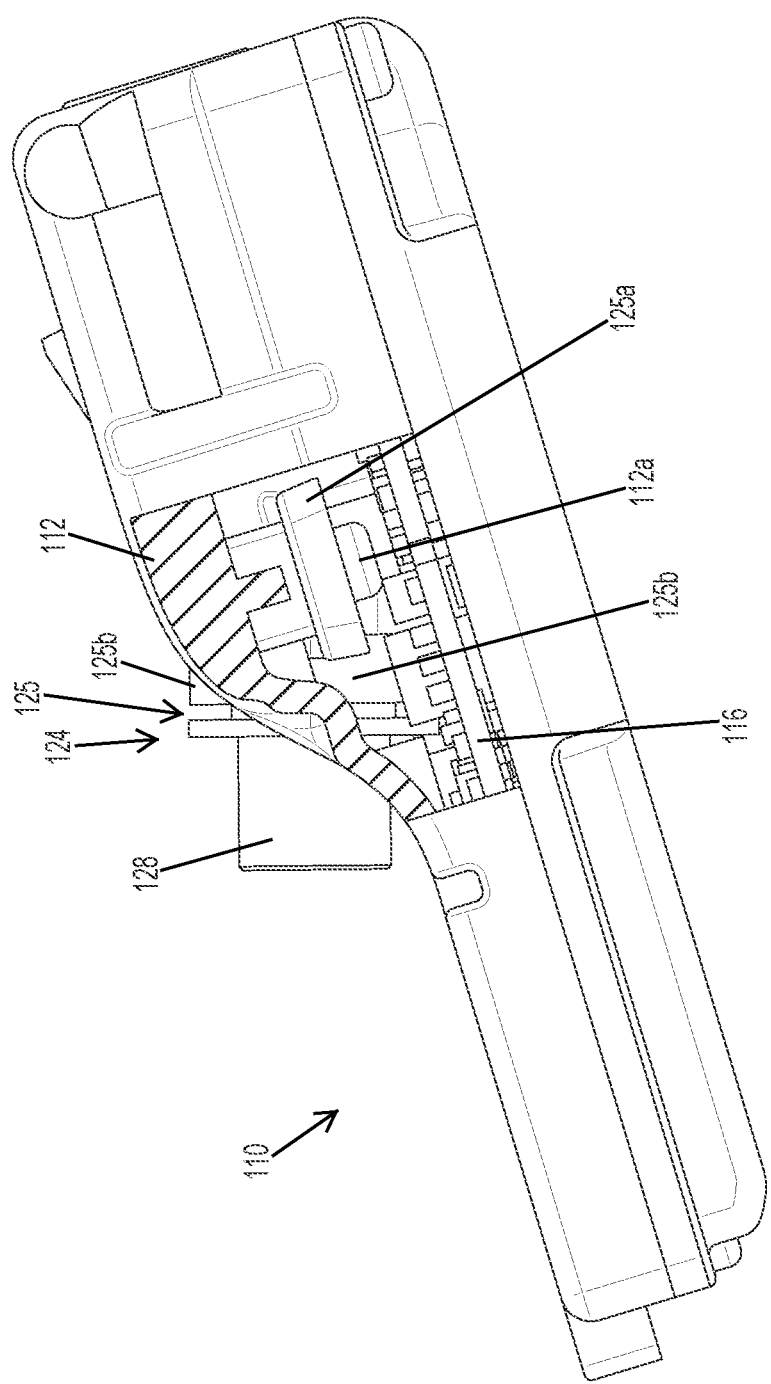
FIG. 13 is a side elevation and partial sectional view of the vehicular camera system of FIG. 11.

Optionally, and with reference to FIGS. 11-13, a camera module 110 may be adjustable to adapt or configure the module for different windshield applications (having different angles relative to horizontal) of different vehicles, while still providing the desired, generally horizontal, forward field of view of the camera or imager assembly 124. The camera module 110 is configured to mechanically attach to a frame or bracket 160, which includes a plurality of fixing elements or attaching elements 176, which are configured for adhesive attachment to the in-cabin surface of the vehicle windshield. The camera module 110 may attach to the frame or bracket (with the frame or bracket attached at the windshield surface) via any suitable means, such as via a sliding engagement or snap attachment or the like.

As can be seen with reference to FIGS. 12A and 12B, the imager assembly 124 (including the imager 126, lens 128, imager circuit element or board 130 and lens holder 132) extends through the opening 118 of the main circuit element or board 116 and may be adjusted or pivoted relative to the camera module housing 112 and main circuit board 116 to adjust the angle of the imager assembly (and the imager 126 and lens 128) relative to horizontal so as to provide the desired field of view and viewing angle or lens tip angle of the imager assembly for different windshield/vehicle applications. For example, and as shown in FIG. 12A, for a windshield with a reduced slope, the imager assembly 124 is pivoted or adjusted or set to provide the desired or appropriate lens tip angle when the camera module 110 is attached at the frame or bracket 160 at the windshield 102. For a windshield with a greater slope, and such as shown in FIG. 12B, the imager assembly 124 is pivoted or adjusted or set at a different angle relative to the main circuit board 116 to provide the desired or appropriate lens tip angle when the camera module 110 is attached at the frame or bracket 160 at the windshield. In both configurations shown in FIGS. 12A and 12B, the distance D from the inner surface of the windshield 102 to the lower surface of the housing 112 (when the camera module 110 is attached at the frame or bracket 160 at the windshield) is about the same because the camera modules mount or attach at the windshield in the same manner, with only the imager assembly being adjusted or pivoted within the module to adjust the viewing angle or lens tip angle of the imager assembly.

The imager assembly 124 is mounted at the housing 112 (or to the main circuit board 116 or the like) via one or more threaded fasteners. For example, and as shown in FIG. 13, the imager assembly 124 may include a holder or mounting structure 125 (such as a plastic holder or the like) that is attached at the housing 112 and supports the imager 126 and lens assembly 128 and imager circuit board 130). The holder 125 includes a mounting or stationary or fixed portion 125a that may be attached or fastened to a threaded fastener 112a of the housing, whereby a rotatable portion or adjustable portion 125b of holder 125 of imager assembly 124 may be rotatable or pivotable or adjustable relative to the mounting portion 125a to provide for adjustment of the tip angle of the lens 128 and viewing angle of the imager 126 relative to the housing 112 and main circuit board 116. The adjustable portion 125b of the holder 125 of imager assembly 124 thus may be adjusted relative to the mounting portion 125a to provide the desired tip angle or viewing angle and may be secured at the selected or adjusted or appropriate orientation, such as via tightening of a fastener or the like. Optionally, the adjustable portion 125b may have a ratcheting engagement with the mounting portion 125a or may have multiple detent settings, such that an operator adjusts or sets or clicks the adjustable portion 125b to the desired or appropriate angle relative to the mounting portion 125a to set the desired or appropriate viewing angle of the imager and lens for the particular windshield angle of the windshield of the particular vehicle application of the camera module 110. Optionally, instead of having an adjustable holder portion, the holder may be removable and replaceable so that an appropriately angled holder may be selected for the particular windshield application, with the camera and lens and circuit board and the like being common components for various applications.

Thus, the camera module of the present invention provides for a low profile module that may be selected or adjusted to provide a desired viewing angle for the particular application of the camera module. The module thus keeps the lens angle or viewing angle of the imager in the same orientation or position for different windshield angle applications. The module may be adapted or configured for different applications by adjusting the camera holder or installing an appropriate or selected low cost plastic holder or replacing the plastic holder with an appropriate or selected holder, while keeping the camera and lens and PCB and housing the same or common components of the module for the various windshield applications (so that the manufacturer does not have to replace the PCB for different windshield angles), and while keeping the profile of the module the same for various windshield applications. The holder may be threadedly fastened or screwed to the cover or housing, such as at either side of the holder (with one fastener at one side of the holder shown in FIG. 13).

Because of the number of components established at the main circuit board, it is desirable to have the main circuit board comprise a double sided PCB with circuitry and components established at both sides of the circuit board. The flexible connector or cable provides LVDS signals conveying image data captured by the imager to the image processor of the main circuit board. The aperture or opening or hole in the main circuit board provides for passage of the flexible connector through the circuit board so as to establish electrical connection to the opposite side of the main circuit board, and the aperture or opening or hole in the main circuit board also at least partially receives a portion of imager assembly (such as a portion of the imager circuit board and/or imager and/or lens holder and/or lens) to provide a lower profile camera system or module.

Optionally, the camera module may include ventilation means for ventilating the module at the windshield (such as by utilizing aspects of the modules described in U.S. patent application Ser. No. 11/721,406, filed Jun. 11, 2007 and published Dec. 3, 2009 as U.S. Publication No. US-2009-0295181; and/or U.S. patent application Ser. No. 12/393,223, filed Feb. 26, 2009, abandoned, which are hereby incorporated herein by reference in their entireties). For example, the ventilation means may comprise one or more vents or ports or ventilation openings (such as a vent or port or opening established through the housing and/or gasket and/or frame or the like), a gas permeable and fluid impermeable material, a baffle that passes air and that blocks moisture, and/or a breathable membrane and/or the like. Such ventilation means may be provided to reduce moisture or fogging of the windshield at the viewing area of the camera or imager. Optionally, a localized heater element or grid may be established at the windshield (such as a conductive trace, such as a transparent conductive trace or the like, established at the in-cabin surface of the windshield local to the camera module) to provide heating of the windshield at the area through which the camera views, in order to reduce moisture or fogging of the windshield at the viewing area of the camera or imager.

Terms such as top side, underside, and height are used herein in a relative sense and are not intended to be limiting with respect to vertical or horizontal orientation. For example, in a hypothetical example, a camera system may be installed such that a top side is positioned below an underside.

According to an aspect of the present invention, a vehicular camera system includes an imager assembly including an imager disposed on an imager circuit board and a lens positioned to direct light to the imager. The vehicular camera system further includes a main circuit board operatively connected to the imager circuit board. The main circuit board includes at least one processor for processing images captured by the imager. The main circuit board includes an opening, and at least a portion of the imager assembly extends through the opening.

The imager circuit board can extend through the opening of the main circuit board. Optionally, for example, and such as best seen in FIG. 6A, the imager circuit board may have a narrowed portion that is sized to fit at least partially through the aperture or opening of the main circuit board, with the wider portion of the imager circuit board disposed above the main circuit board when the imager assembly is disposed at the main circuit board. Thus, a portion of the imager circuit board extends through the opening of the main circuit board, and optionally, a portion of the imager and/or of the lens holder and/or the lens may extend at least partially through the opening of the main circuit board when the imager assembly is disposed at the main circuit board.

The vehicular camera system can further include a housing having a breadth and a height. The main circuit board can extend generally along the breadth of the housing and the imager circuit board can extend generally along the height of the housing.

The imager circuit board can include a flexible portion that terminates at an electrical connector. The electrical connector can be connected to an underside of the main circuit board, the underside being opposite a top side of the main circuit board at which the lens is positioned.

The vehicular camera system can further include a connector resilient member sandwiched between the electrical connector and the housing to seat the electrical connector to a mating electrical connector positioned on the underside of the main circuit board.

The housing can be configured to be mounted to the front of a vehicle.

The vehicular camera system can further include a lens holder connecting the lens and the imager circuit board.

The lens holder can extend through the opening of the main circuit board.

The opening can be surrounded by material of the main circuit board.

The opening can have a rectangular shape.

The opening can have rounded inside corners.

The imager circuit board can be tilted at an angle with respect to the main circuit board.

The vehicular camera system can further include a stray light shield positioned to reduce stray light reflected to the lens.

According to another aspect of this disclosure, a method of assembling a vehicular camera system includes positioning an imager assembly at a top side of a main circuit board. The imager assembly can have a lens and an imager for capturing images and the main circuit board can have a processor for processing the captured images. The method further includes extending a portion of the imager assembly through an opening in the main circuit board, and operatively connecting the portion of the imager assembly with an underside of the main circuit board opposite the top side.

Extending a portion of the imager assembly through an opening can include extending a flexible portion through the opening.

Operatively connecting can include connecting an electrical connector of the imager assembly with a mating electrical connector of the main circuit board.

The method can further include positioning a connector resilient member between an inside of a housing and the electrical connector.

The method can further include fastening a lower cover of the housing to an upper cover of the housing to compress the connector resilient member to firmly seat the electrical connector to the mating electrical connector.

The method can further include fastening the imager assembly to the upper cover of the housing.

The method can further include attaching a stray light shield to the housing.

The camera or imager or imaging sensor may comprise any suitable camera or imager or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. provisional application Ser. No. 61/563,965, filed Nov. 28, 2011, which is hereby incorporated herein by reference in its entirety.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, an array of a plurality of photosensor elements arranged in 640 columns and 480 rows (a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, such as in the manner described in U.S. Pat. Nos. 5,550,677; 5,877,897; 6,498,620; 5,670,935; 5,796,094 and/or 6,396,397, and/or U.S. provisional application Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed 2012; Ser. No. 61/607,229, filed Mar. 6, 2012; Ser. No. 61/605,409, filed Mar. 1, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/579,682, filed Dec. 23, 2012; Ser. No. 61/570,017, filed Dec. 13, 2012; Ser. No. 61/568,791, filed Dec. 9, 2011; Ser. No. 61/567,446, filed Dec. 6, 2011; Ser. No. 61/567,150, filed Dec. 6, 2011; Ser. No. 61/565,713, filed Dec. 1, 2011; Ser. No. 61/559,970, filed Nov. 15, 2011; Ser. No. 61/552,167, filed Oct. 27, 2011; and/or Ser. No. 61/540,256, filed Sep. 28, 2011, and/or PCT Application No. PCT/US2012/048800, filed Jul. 30, 2012 and published Feb. 7, 2013 as International Publication No. WO 2013/019707, and/or PCT Application No. PCT/US2012/048110, filed Jul. 25, 2012 and published Jan. 31, 2013 as International Publication No. WO 2013/016409, and/or U.S. patent application Ser. No. 13/534,657, filed Jun. 27, 2012 and published Jan. 3, 2013 as U.S. Publication No. US-2013-0002873, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010, and/or U.S. patent application Ser. No. 12/508,840, filed Jul. 24, 2009, and published Jan. 28, 2010 as U.S. Pat. Publication No. US 2010-0020170; and/or PCT Application No. PCT/US2012/048110, filed Jul. 25, 2012 and published Jan. 31, 2013 as International Publication No. WO 2013/016409, and/or U.S. patent application Ser. No. 13/534,657, filed Jun. 27, 2012 and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361; and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO/2009/036176, and/or PCT Application No. PCT/US2008/078700, filed Oct. 3, 2008 and published Apr. 9, 2009 as International Publication No. WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877, 897; 5,949,331; 6,222,447; 6,302,545; 6,396,397; 6,498, 620; 6,523,964; 6,611,202; 6,201,642; 6,690,268; 6,717, 610; 6,757,109; 6,802,617; 6,806,452; 6,822,563; 6,891, 563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional application Ser. No. 60/628,709, filed Nov. 17, 2004; Ser. No. 60/614,644, filed Sep. 30, 2004; Ser. No. 60/618, 686, filed Oct. 14, 2004; Ser. No. 60/638,687, filed Dec. 23, 2004, which are all hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538, 724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226, 628, filed Sep. 14, 2005 and published Mar. 23, 2006 as U.S. Publication No. US-2006-0061008, and/or Ser. No. 12/578, 732, filed Oct. 14, 2009 and published Apr. 22, 2010 as U.S. Publication No. US-2010-00097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011 and published Jun. 28, 2012 as U.S. Publication No. US-2012-0162427, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/ 028686, and/or PCT Application No. PCT/US11/62834, filed Dec. 1, 2011 and published Jun. 7, 2012 as International Publication No. WO 2012-075250, and/or U.S. patent application Ser. No. 13/333,337, filed Dec. 21, 2011 and published Jun. 28, 2012 as U.S. Publication No. US-2012- 0162427, and/or U.S. provisional application Ser. No. 61/615,410, filed Mar. 26, 2012; Ser. No. 61/613,651, filed Mar. 21, 2012; Ser. No. 61/588,833, filed Jan. 20, 2012; Ser. No. 61/570,017, filed Dec. 13, 2011; Ser. No. 61/568,791, filed Dec. 9, 2011; Ser. No. 61/559,970, filed Nov. 15, 2011; Ser. No. 61/540,256, filed Sep. 28, 2011, which are hereby incorporated herein by reference in their entireties.

Optionally, the video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/ or 6,690,268, and/or in U.S. patent application Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255, 451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

While the foregoing provides certain non-limiting example embodiments, it should be understood that combinations, subsets, and variations of the foregoing are contemplated. The monopoly sought is defined by the claims.

What is claimed is:

1. A camera system for a vehicle, said camera system comprising:
   a camera module comprising an imager assembly, a main circuit board and a camera housing;
   wherein said imager assembly comprises (i) an imager disposed on an imager circuit board and (ii) a lens assembly comprising a lens barrel accommodating a lens;
   a bracket configured to attach at a windshield of a vehicle equipped with said camera system;
   wherein said bracket is configured to receive said camera module so that, with said camera module received by said bracket and with said bracket attached at the windshield, said camera module is mounted at the windshield with said lens viewing through the windshield in a forward direction of travel of the equipped vehicle;
   wherein said main circuit board is operatively connected to said imager circuit board, said main circuit board including at least one processor for processing image data captured by said imager;
   wherein said camera housing houses and encloses said main circuit board, said imager circuit board and a portion of said lens assembly;
   wherein said camera housing has an aperture;
   wherein said lens barrel extends from the portion of said lens assembly enclosed by said camera housing through said aperture to protrude outside said camera housing;
   wherein said camera housing comprises a forward portion in front of where said imager assembly is disposed in said camera housing;
   wherein said main circuit board is disposed at least within said forward portion;
   wherein, with said camera module received by said bracket and with said bracket attached at the windshield, said forward portion of said camera housing is below said lens barrel; and
   a separate stray light shield formed separate from said camera housing, wherein said stray light shield is attached at said forward portion of said camera housing to reduce incidence of stray light at said lens.

2. The camera system of claim 1, wherein said lens assembly is protected against contaminant incursion.

3. The camera system of claim 2, wherein a gasket is disposed at said bracket, and wherein, with said camera module received by said bracket and with said bracket attached at the windshield, said gasket protects said lens from contaminants.

4. The camera system of claim 1, wherein said stray light shield comprises ridges that, with said camera module received by said bracket and with said bracket attached at the windshield, reduce incidence of stray light at said lens.

5. The camera system of claim 1, wherein said stray light shield is detachably attached at said forward portion of said camera housing.

6. The camera system of claim 1, wherein said bracket is configured to attach at attaching elements that are adhesively attached at an in-cabin surface of the windshield.

7. The camera system of claim 1, wherein said imager circuit board extends at least partially through an opening of said main circuit board.

8. The camera system of claim 1, wherein said lens barrel is tilted at an angle with respect to said main circuit board.

9. A camera system for a vehicle, said camera system comprising:
   a camera module comprising an imager assembly, a main circuit board and a camera housing;
   wherein said imager assembly comprises (i) an imager disposed on an imager circuit board and (ii) a lens assembly comprising a lens barrel accommodating a lens;
   a bracket configured to attach at a windshield of a vehicle equipped with said camera system;
   wherein said bracket is configured to receive said camera module so that, with said camera module received by said bracket and with said bracket attached at the windshield, said camera module is mounted at the windshield with said lens viewing through the windshield in a forward direction of travel of the equipped vehicle;
   wherein said main circuit board is operatively connected to said imager circuit board, said main circuit board including at least one processor for processing image data captured by said imager;
   wherein said camera housing houses and encloses said main circuit board, said imager circuit board and a portion of said lens assembly;
   wherein said camera housing has an aperture;
   wherein said lens barrel extends from the portion of said lens assembly enclosed by said camera housing through said aperture to protrude outside said camera housing;
   wherein said camera housing comprises a forward portion in front of where said imager assembly is disposed in said camera housing;
   wherein said main circuit board is disposed at least within said forward portion;
   wherein, with said camera module received by said bracket and with said bracket attached at the windshield, said forward portion of said camera housing is below said lens barrel;
   a separate stray light shield formed separate from said camera housing, wherein said stray light shield is attached at said forward portion of said camera housing to reduce stray light reflected to said lens;
   wherein said stray light shield is detachably attached at said forward portion of said camera housing; and
   wherein said stray light shield comprises ridges that, with said camera module received by said bracket and with said bracket attached at the windshield and with said stray light shield attached at said forward portion of said camera housing, reduce incidence of stray light at said lens.

10. The camera system of claim 9, wherein said stray light shield snap attaches at said forward portion of said camera housing.

11. The camera system of claim 10, wherein said stray light shield snap attaches via a mechanical clip and notch connection at each side of said camera housing.

12. The camera system of claim 9, wherein said lens assembly is protected against contaminant incursion.

13. The camera system of claim 12, wherein a gasket is disposed at said bracket, and wherein, with said camera module received by said bracket and with said bracket attached at the windshield, said gasket protects said lens from contaminants.

14. The camera system of claim 9, wherein said bracket is configured to attach at attaching elements that are adhesively attached at an in-cabin surface of the windshield.

15. The camera system of claim 9, wherein said imager circuit board extends at least partially through an opening of said main circuit board.

16. The camera system of claim 9, wherein said lens barrel is tilted at an angle with respect to said main circuit board.

17. A camera system for a vehicle, said camera system comprising:
   a camera module comprising an imager assembly, a main circuit board and a camera housing;
   wherein said imager assembly comprises (i) an imager disposed on an imager circuit board and (ii) a lens assembly comprising a lens barrel accommodating a lens;
   a bracket configured to attach at a windshield of a vehicle equipped with said camera system;
   wherein said bracket is configured to receive said camera module so that, with said camera module received by said bracket and with said bracket attached at the windshield, said camera module is mounted at the windshield with said lens viewing through the windshield in a forward direction of travel of the equipped vehicle;
   wherein said main circuit board is operatively connected to said imager circuit board, said main circuit board including at least one processor for processing image data captured by said imager;
   wherein said lens barrel is tilted at an angle with respect to said main circuit board;
   wherein said camera housing houses and encloses said main circuit board, said imager circuit board and a portion of said lens assembly;
   wherein said camera housing has an aperture;
   wherein said lens barrel extends from the portion of said lens assembly enclosed by said camera housing through said aperture to protrude outside said camera housing;
   wherein said camera housing comprises a forward portion in front of where said imager assembly is disposed in said camera housing;
   wherein said main circuit board is disposed at least within said forward portion;
   wherein said imager circuit board is not accommodated in said forward portion of said camera housing;
   wherein, with said camera module received by said bracket and with said bracket attached at the windshield, said forward portion of said camera housing is below said lens barrel; and
   a separate stray light shield formed separate from said camera housing, wherein said stray light shield is attached at said forward portion of said camera housing to reduce incidence of stray light at said lens.

18. The camera system of claim 17, wherein said lens assembly is protected against contaminant incursion.

19. The camera system of claim 18, wherein a gasket is disposed at said bracket, and wherein, with said camera module received by said bracket and with said bracket attached at the windshield, said gasket protects said lens from contaminants.

20. The camera system of claim 17, wherein said stray light shield comprises ridges that, with said camera module received by said bracket and with said bracket attached at the windshield, reduce incidence of stray light at said lens.

21. The camera system of claim 17, wherein said stray light shield is detachably attached at said forward portion of said camera housing.

22. The camera system of claim 17, wherein said bracket is configured to attach at attaching elements that are adhesively attached at an in-cabin surface of the windshield.

23. The camera system of claim 17, wherein said imager circuit board extends at least partially through an opening of said main circuit board.

* * * * *